(12) United States Patent
Huang

(10) Patent No.: US 7,243,936 B2
(45) Date of Patent: Jul. 17, 2007

(54) FOLDABLE BICYCLE FRAME

(76) Inventor: Kuo-Ming Huang, No. 181, Lane 412, Jhensing Rd., East District, Taichung City 401 (TW)

( * ) Notice: Subject to any disclaimer, the term of this patent is extended or adjusted under 35 U.S.C. 154(b) by 215 days.

(21) Appl. No.: 11/165,487

(22) Filed: Jun. 24, 2005

(65) Prior Publication Data

US 2005/0285366 A1 Dec. 29, 2005

(30) Foreign Application Priority Data

Jun. 28, 2004 (TW) ............... 93210136 U

(51) Int. Cl.
*B62K 19/02* (2006.01)
(52) U.S. Cl. ............... 280/278; 280/287; 280/298
(58) Field of Classification Search ............... 280/278, 280/287, 298
See application file for complete search history.

(56) References Cited

U.S. PATENT DOCUMENTS 3,164,397 A * 1/1965 Kilmer ............... 280/287
3,865,403 A * 2/1975 Majerus ............... 280/287
4,113,271 A * 9/1978 Furia ............... 280/287

\* cited by examiner

*Primary Examiner*—Lesley D. Morris
*Assistant Examiner*—Marlon Arce-Diaz
(74) *Attorney, Agent, or Firm*—Browdy and Neimark, PLLC

(57) ABSTRACT

A foldable bicycle frame includes top and bottom connecting bars respectively pivotally connected between front and rear top tubes of the bicycle, a plurality of springs supported between the top and bottom connecting bars for pushing the top and bottom connecting bars vertically away from each other for allowing the front top tube and the rear top tube to be turned relative to each other between an operative position and a non-operative position, and a locking mechanism controlled by a locking lever to lock the top connecting bar and the bottom connecting bar in a position where the front top tube and the rear top tube aren't movable relative to each other.

12 Claims, 10 Drawing Sheets

FOLDABLE BICYCLE FRAME

BACKGROUND OF THE INVENTION

1. Field of the Invention

The present invention relates to a bicycle frame and more particularly, to a foldable bicycle frame that can conveniently be carried by the user when it is set in the folded non-operative position.

2. Description of the Related Art

FIG. 13 shows a foldable bicycle frame according to the prior art. According to this design, the foldable bicycle frame 70 comprises a top tube 71, a folding structure 80 coupled between the two parts of the top tube 71, a head tube 72 at one end of the top tube 71, a seat tube 73 at the rear end of the top tube 71, seat stays 74 obliquely backwardly extended from the seat tube 73, and chain stays 75 connected to the seat stays 74. Further, the head tube 72 holds a front fork with a handlebar at the top and a front wheel the bottom (not shown). The seat tube 73 supports a seat pillar with a saddle (not shown). Further, a rear wheel (not shown) is pivotally provided at the connection area between the seat stays 74 and the chain stays 75.

The folding structure 80 comprises a base frame 81 and a movable frame 82 respectively affixed to the two parts of the top tube and hinged together, and a quick-release lock 83 adapted to lock the movable frame 82 to the base frame 81. When the quick-release lock 83 is locked, the movable frame 82 is locked to the base frame 81, and the top tube 71 is held in the operative position (see FIG. 13). On the contrary, when unlocked the quick-release lock 83, the movable frame 82 can be turned relative to the base frame 81 to let the foldable bicycle frame 70 be set in the folded non-operative position (see FIG. 14).

The design of foldable bicycle frame 70 can easily be set between the folded non-operative position and the extended operative position. However, when the foldable bicycle frame 70 is folded up, the folded top tube 71 is not locked in the folded position and tends to be vibrated by an external force accidentally. Vibrating the received foldable bicycle frame 70 may cause the folding structure 80 to break. Further, when the foldable bicycle frame 70 is folded up, the two parts of the folded top tube 71 is not kept in parallel, i.e., a big contained angle is defined between the two parts of the folded top tube 71 and the front wheel and rear wheel of the folded bicycle frame 70 are not kept in parallel, resulting in a carrying inconvenience. When the user pulls the folded bicycle frame 70 on the ground, the folded bicycle frame 70 cannot be moved steadily and will fall to the ground. Further, this structure of foldable bicycle frame 70 still occupies much storage space when folded up.

SUMMARY OF THE INVENTION

The present invention has been accomplished under the circumstances in view. It is the main object of the present invention to provide a foldable bicycle frame that can easily be folded up and locked in the folded non-operative position convenient for carrying by hand or pulling on the ground by the user.

It is another object of the present invention to provide a foldable bicycle frame that keeps the whole structure steady for riding safely when set in the extended operative position.

To achieve these objects of the present invention, the foldable bicycle frame comprises a top tube having a front top tube with a rear coupling end and a rear top tube with a front coupling end, a head tube at a front side of the top tube, a seat tube at a rear side of the top tube, and a rear fork assembly obliquely backwardly extending from a bottom side of the seat tube opposite to the top tube, and a folding structure connected between the rear coupling end of the front top tube and the front coupling end of the rear top tube. The folding structure comprises a top connecting bar and a bottom connecting bar arranged in parallel at top and bottom sides of the front top tube and the rear top tube and respectively coupled to rear coupling end of the front top tube and the front coupling end of the rear top tube to join the front top tube and the rear top tube and respectively vertically movable relative to the front top tube and the rear top tube between a first position where the top connecting bar and the bottom connecting bar are respectively engaged with the front top tube and the rear top tube at top and bottom sides to prohibit relative movement between the front top tube and the rear top tub, and a second position where the top connecting bar and the bottom connecting bar are disengaged from the front top tube and the rear top tube for allowing the front top tube and the rear top tube to be turned relative to each other; at least one spring stopped between the top connecting bar and the bottom connecting bar for supporting the top connecting bar and the bottom connecting bar in the second position; and a locking mechanism for locking the top connecting bar and the bottom connecting bar in the first position. The locking mechanism comprises an axle mounted in the top connecting bar and the bottom connecting bar, and an operating member provided at one end of the axle and turnable relative to the axle between a locking position to lock the top connecting bar and the bottom connecting bar in the first position, and an unlocking position to unlock the top connecting bar and the bottom connecting bar for enabling the top connecting bar and the bottom connecting bar to be moved by the spring to the second position.

DETAILED DESCRIPTION OF THE INVENTION

Figure 1:
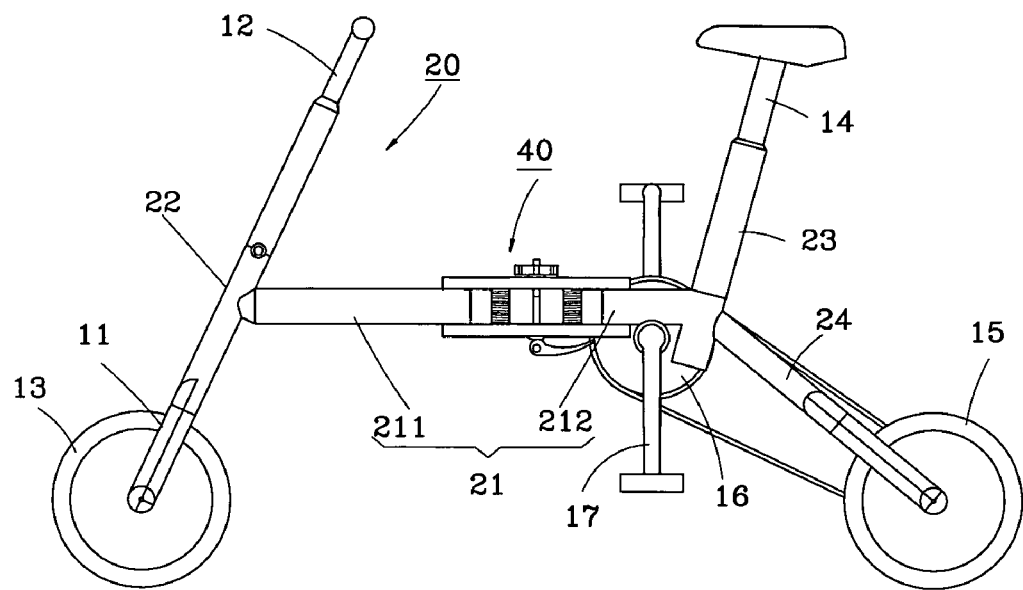
FIG. 1 is a side plain view of a foldable bicycle constructed according to a first embodiment of the present invention.

Referring to FIG. 1, a foldable bicycle frame 20 in accordance with the first embodiment of the present invention is shown comprising a top tube 21, a head tube 22 at the front side of the top tube 21, a seat tube 23 at the rear side of the top tube 21, a rear fork assembly 24 obliquely backwardly extending from the bottom side of the seat tube 22 and supporting a rear wheel 15, a front fork 11 pivotally coupled to the head tube 22 at the bottom side and holding a front wheel 13, a handlebar 12 pivotally coupled to the head tube 22 at the top side and fixedly connected to the front fork 11, a seat pillar 14 fastened to the seat tube 23, a folding structure 40 installed in the top tube 21, and a chain drive formed of a chain wheel 16 and a pedal mechanism 17 and the related parts for pedaling by the bicycle rider to rotate the rear wheel 15.

Figure 2:
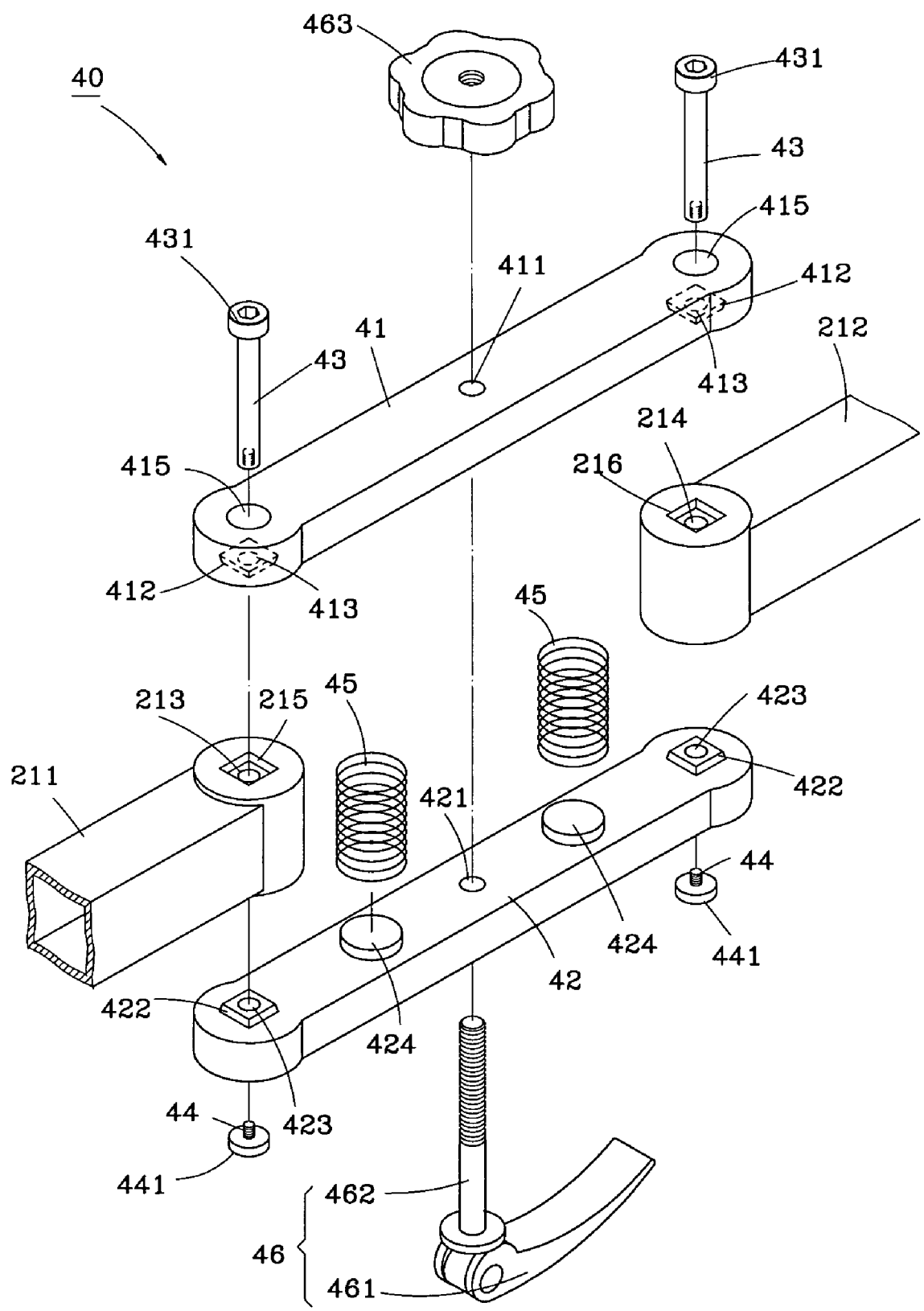
FIG. 2 is an exploded view of the folding structure of the foldable bicycle frame according to the first embodiment of the present invention.

Referring to FIG. 2, the folding structure 40 controls folding of the top tube 21. The top tube 21 is comprised of a front top tube 211 and a rear top tube 212. The front top tube 211 and the rear top tube 212 are joined by the folding structure 40. The front top tube 211 has two rectangular recesses 215 respectively formed in the top and bottom sides of the rear end thereof, and an axle hole 213 extending through the rectangular recesses 215. The rear top tube 212 has two rectangular recesses 216 respectively formed in the top and bottom sides of the rear end thereof, and an axle hole 214 extending through the rectangular recesses 216.

The folding structure 40 comprises a top connecting bar 41, a bottom connecting bar 42, two pins 43, two screw members 44, two spring members 45, and a locking mechanism 46.

The top connecting bar 41 and the bottom connecting bar 42 are arranged in parallel at the top and bottom sides of the top tube 21 between the front top tube 211 and the rear top tube 212, each having a center through hole 411 or 421 at the center, two axle holes 413 or 423 near the two distal ends, and two rectangular locating blocks 412 or 422 respectively protruded from the bottom or top side around the axle holes 413 or 423 for fitting into the rectangular recesses 215 of the front top tube 211 and the rectangular recesses 216 of the rear top tube 212 respectively.

Figure 3:
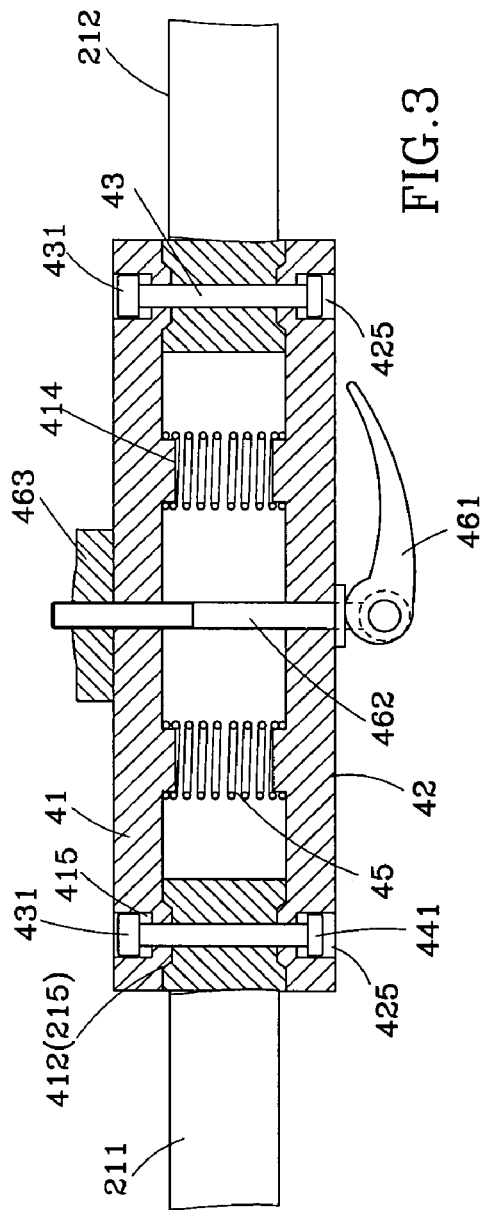
FIG. 3 is a sectional assembly view of FIG. 2, showing the folding structure of the foldable bicycle frame locked.
Figure 4:
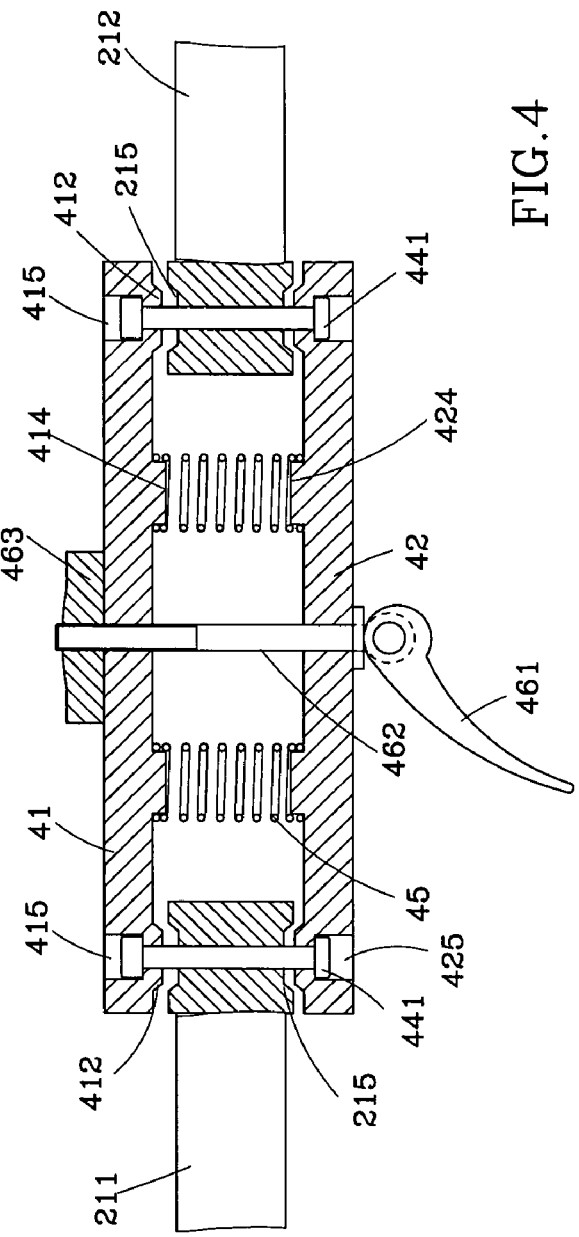
FIG. 4 is similar to FIG. 3 but showing the folding structure of the foldable bicycle frame unlocked.

The two pins 43 are respectively inserted through the axle holes 413 of the top connecting bar 41, the axle hole 213 and 214 of the top tube 21 and the axle holes 423 of the bottom connecting bar 42. The screw members 44 are respectively fastened to the pins 43 to secure the pins 43 to the top connecting bar 41, the bottom connecting bar 42 and the top tube 21, allowing movement of the connecting bars 41 and 42 vertically relative to the top tube 21 between a first position shown in FIG. 3 and a second position shown in FIG. 4. The pins 43 each have one end terminating in an expanded head 431 and the other end mounted with the respective screw member 44. The screw members 44 each have an expanded head 441 stopped against one end of each of the pins 43 remote from the head 431 of the respective pin 43. When the connecting bars 41 and 42 are respectively moved to the first position shown in FIG. 3, the rectangular locating blocks 412 and 422 are respectively engaged into the rectangular recesses 215 of the front top tube 211 and the rectangular recesses 216 of the rear top tube 212, thereby locking the top tube 21 in the operative position. On the contrary, when the connecting bars 41 and 42 are respectively moved to the second position shown in FIG. 4, the rectangular locating blocks 412 and 422 are respectively disengaged from the rectangular recesses 215 of the front top tube 211 and the rectangular recesses 216 of the rear top tube 212, thereby unlocking the top tube 21, and therefore the user can turn the front top tube 211 and the rear top tube 212 around the respective pins 43 to receive the top tube 21 in the folded non-operative position.

The two spring members 45 are compression springs supported between the top connecting bar 41 and the bottom connecting bar 42, each having a top end coupled to a respective bottom locating block 414 at the bottom side of the top connecting bar 41 and a bottom end coupled to a respective top locating block 424 at the top side of the bottom connecting bar 42. The two spring members 45 push the top connecting bar 41 and the bottom connecting bar 42 apart, thereby holding the two connecting bars 41 and 42 in the aforesaid second position.

The locking mechanism 46 comprises an axle 462 inserted through the center through hole 421 of the bottom connecting bar 42 and the center through hole 411 of the top connecting bar 41, a locking lever 461 pivoted to one end, namely, the bottom end of the axle 642, and a knob 463 threaded onto the other end, namely, the top end of the axle 462. The locking lever 461 is turned relative to the axle 462 between the locking position where the locking lever 461 imparts an eccentric pressure to the bottom connecting bar 42, thereby holding the two connecting bars 41 and 42 in the first position, and the unlocking position where the bottom connecting bar 42 and the spring members 45 are released from the constraint and push the two connecting bars 41 and 42 outwards to the second position.

Figure 6:
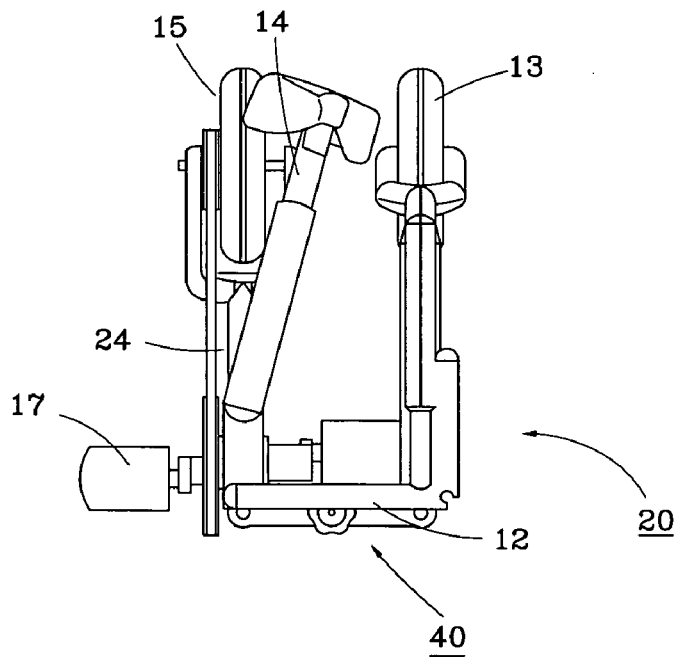
FIG. 6 illustrates the folded status of the foldable bicycle frame according to the first embodiment of the present invention.
Figure 5:
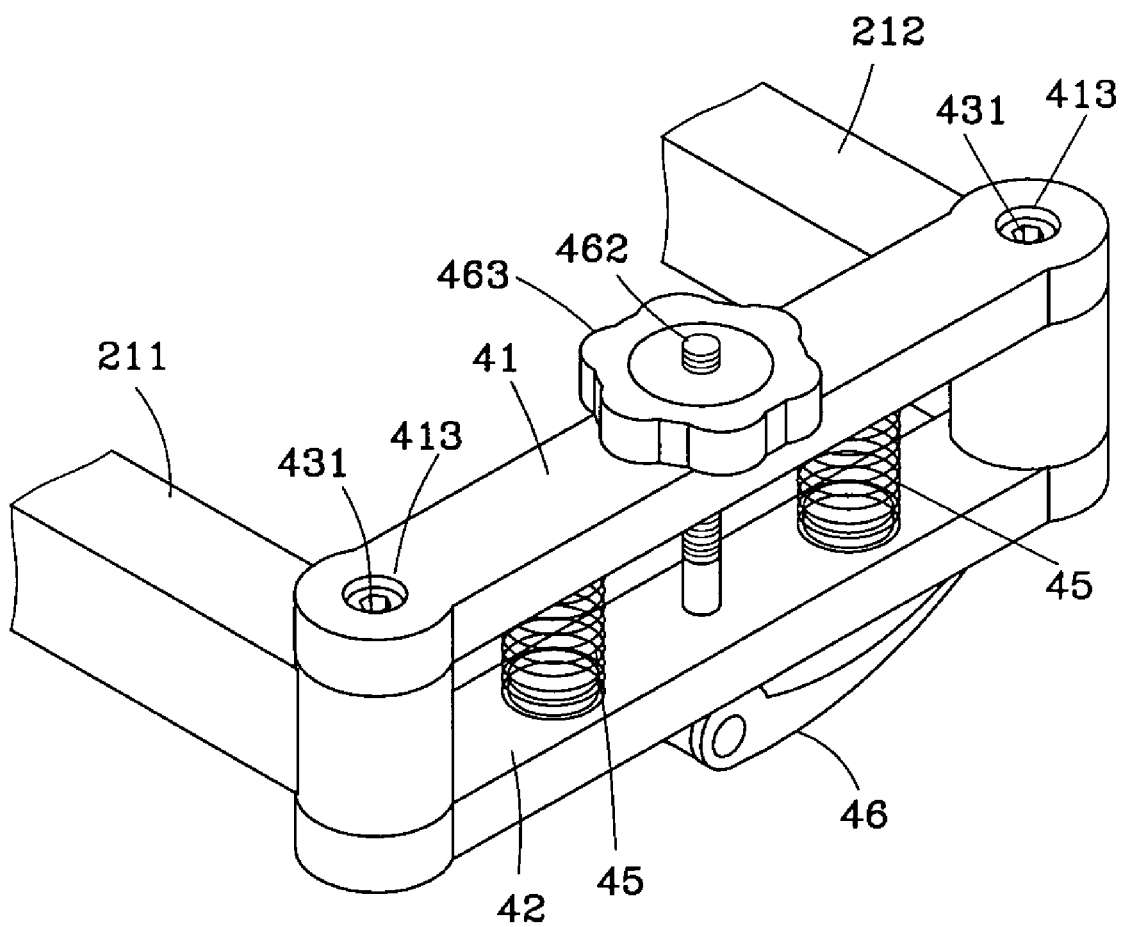
FIG. 5 is a perspective view of a part of the first embodiment of the present invention, showing the folding structure of the foldable bicycle frame in the folded non-operative position.

As indicated above, the foldable bicycle frame 20 uses the locking lever 461 of the locking mechanism 46 to control the position of the connecting bars 41 and 42 and to further lock/unlock the front top tube 211 and the rear top tube 212, allowing the bicycle frame 20 to be set between the folded non-operative position where the front top tube 211 and the rear top tube 212 are held in parallel (as shown in FIGS. 5 and 6) and the extended operative position where the front top tube 211 and the rear top tube 212 are axially aligned in a line (as shown in FIG. 1).

In order to keep the two connecting bars 41 and 42 in balance during movement, the two pins 43 can be respectively press-fitted into the axle hole 213 of the front top tube 211 and the axle hole 214 of the rear top tube 212 and firmly secured thereto through a screw joint. After installation of the pins 43 in the front top tube 211 and the rear top tube 212, the pins 43 are immovable relative to the top tube 21 for guiding movement of the connecting bars 41 and 42 smoothly and stably. When unlocked the locking mechanism 46, the rectangular locating blocks 412 and 422 are respectively disengaged from the rectangular recesses 215 of the front top tube 211 and the rectangular recesses 216 of the rear top tube 212, allowing folding of the top tube 21 smoothly.

Further, the top connecting bar 41 has two top recesses 415 respectively formed in the top side around the respective axle holes 413 for receiving the expanded head 431 of each of the pins 43 respectively, keeping the expanded head 431 of each of the pins 43 in flush with the top side of the top connecting bar 41 so as not hook the user's clothes accidentally; the bottom connecting bar 42 has two bottom recesses 425 respectively formed in the bottom side around the respective axle holes 423 for receiving the expanded head 441 of each of the screw members 44 respectively, keeping the expanded head 441 of each of the screw members 44 in flush with the bottom side of the bottom connecting bar 42 so as not hook the user's clothes accidentally.

Further, it is to be understood that the invention provides a simple and easy-to-operate folding structure for bicycle, enabling the user to conveniently rapidly set the bicycle between the folded non-operative position to save storage space and the extended operative position for riding. In additional to the aforesaid first embodiment of the present invention, the foldable bicycle frame can be variously embodied. In the following alternate forms of the present invention, reference numbers identical to the first embodiment indicate like parts of the foldable bicycle frame.

Figure 7:
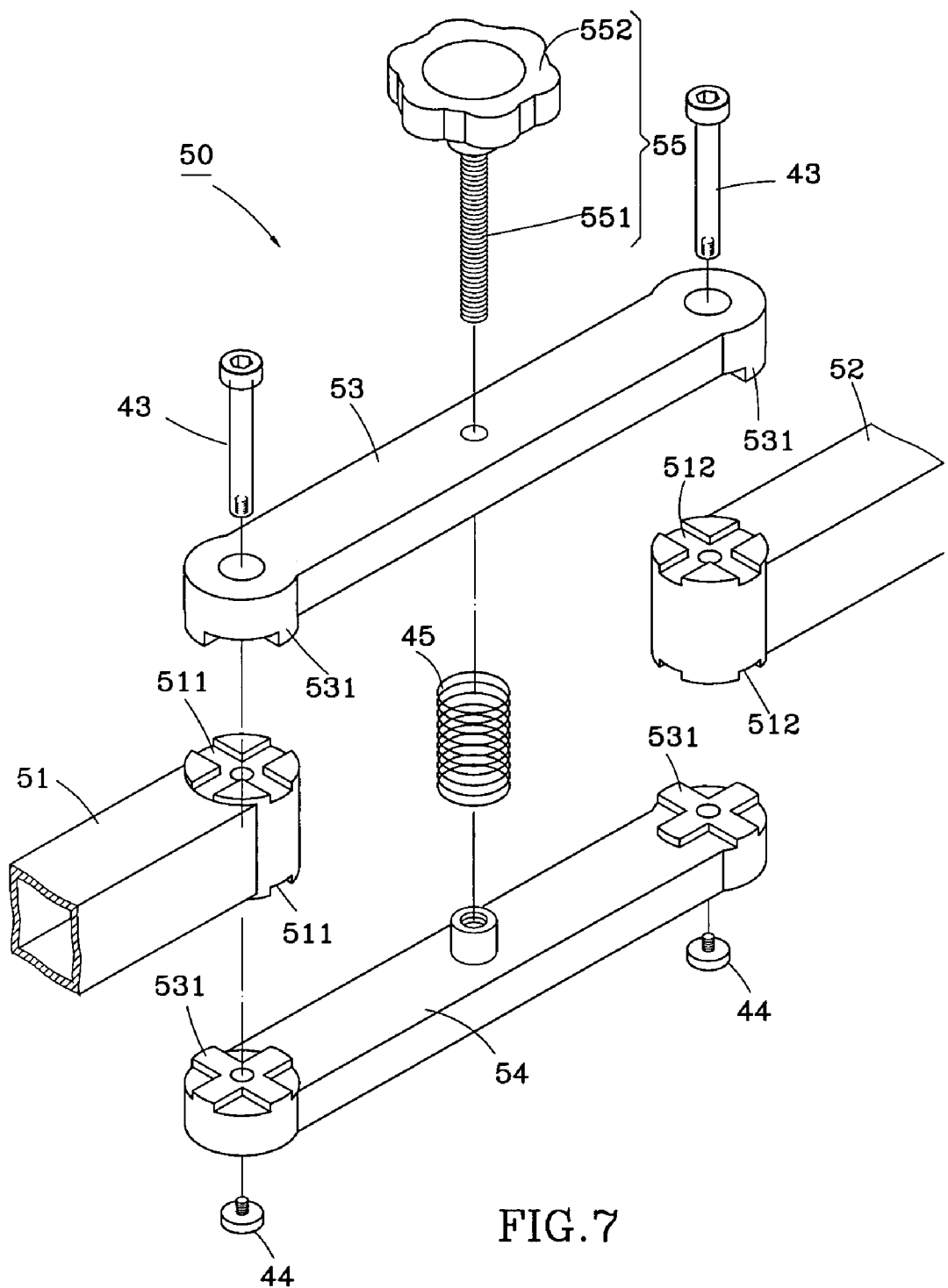
FIG. 7 is an exploded view of a folding structure for foldable bicycle frame according to a second embodiment of the present invention.
Figure 8:
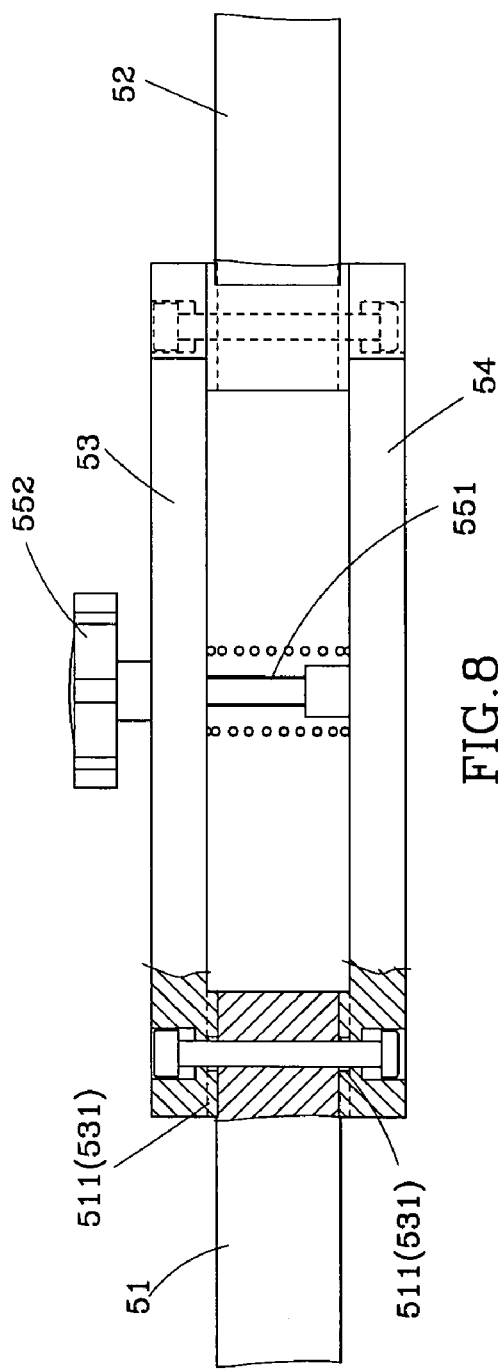
FIG. 8 is a sectional assembly view of FIG. 7, showing the locked status of the folding structure.
Figure 9:
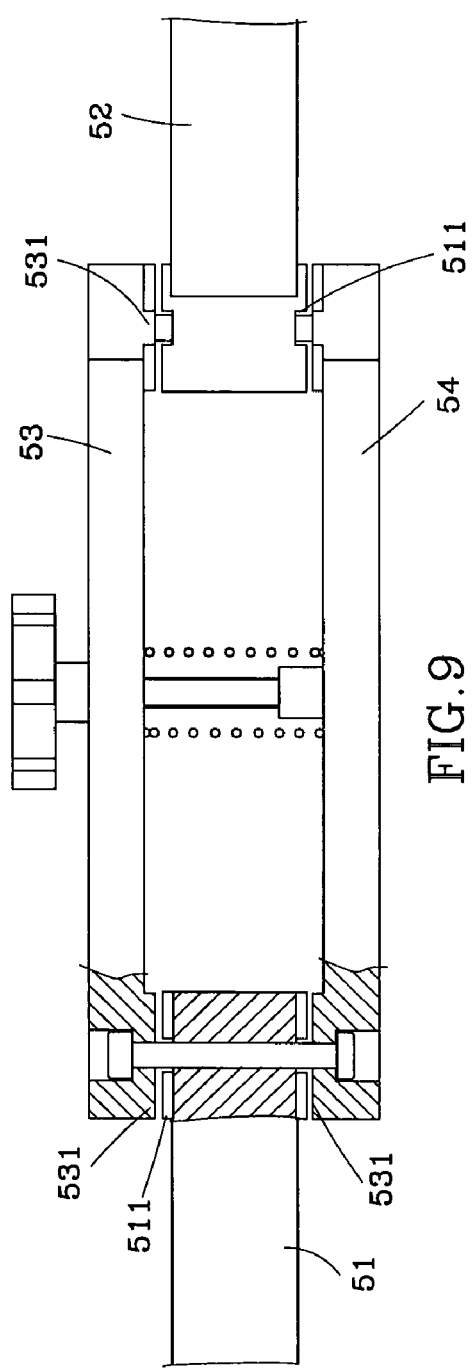
FIG. 9 corresponds to FIG. 8, showing the folding structure unlocked.

FIGS. 7-9 show a foldable bicycle frame according to the second embodiment of the present invention. According to this embodiment, the folding structure, referenced by 50, comprises a top connecting bar 53, a bottom connecting bar 54, two pins 43, two screw members 44, a spring member 45, and a lock screw 55. The front top tube 51 and the rear top tube 52 each have two crossed locating grooves 511 or 512 respectively disposed at the top and bottom sides of the rear or front end thereof. The top connecting bar 53 and the bottom connecting bar 54 each have two crossed locating ribs 531 protruded from the bottom or top side near the two distal ends for engagement with the crossed locating grooves 511 of the front top tube 51 and the crossed locating grooves 512 of the rear top tube 52 respectively. Further, the spring member 45 is supported between the top connecting bar 53 and the bottom connecting bar 54. The locating mechanism, namely, the lock screw 55 has a threaded shank 511 inserted through the top connecting bar 53 and the spring member 45 and threaded into the bottom connecting bar 54, and a knob 552 fixedly provided at one end, namely, the top end of the threaded shank 551 for rotation by the user to move the connecting bars 53 and 54 relative to each other. When rotating the lock screw 55 in one direction, the connecting bars 53 and 54 are moved toward each other to force the respective crossed locating ribs 531 into engagement with the respective crossed locating grooves 511 and 512, thereby locking the front top tube 51 and the rear top tube 52. On the contrary, when rotating the lock screw 55 in the reversed direction, the connecting bars 53 and 54 are released from the constraint of the lock screw 55 and moved apart by the spring member 45 to disengage the respective crossed locating ribs 531 from the respective crossed locating grooves 511 and 512, thereby unlocking the front top tube 51 and the rear top tube 52.

Figure 10:
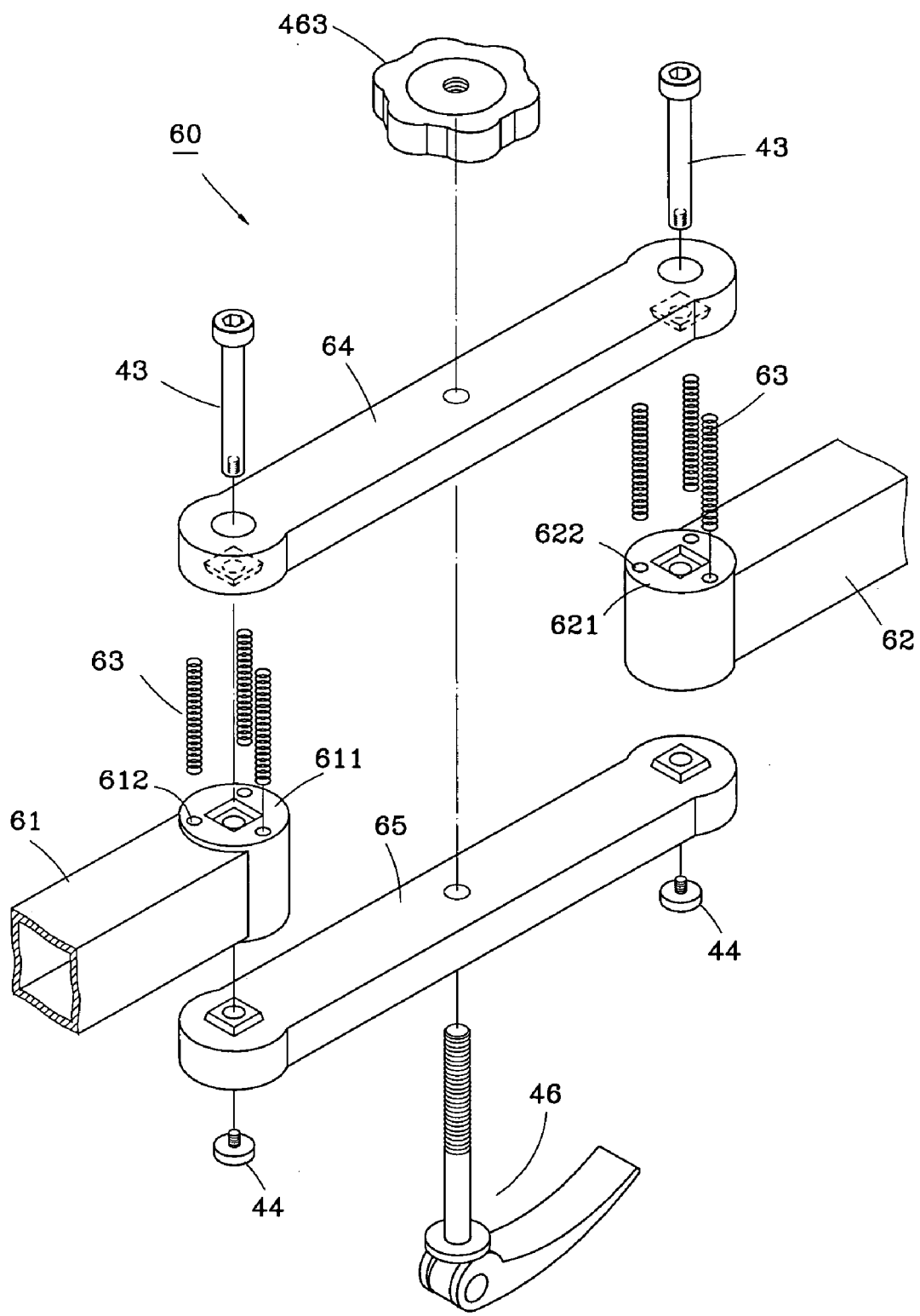
FIG. 10 is an exploded view of a folding structure for foldable bicycle frame according to a third embodiment of the present invention.
Figure 11:
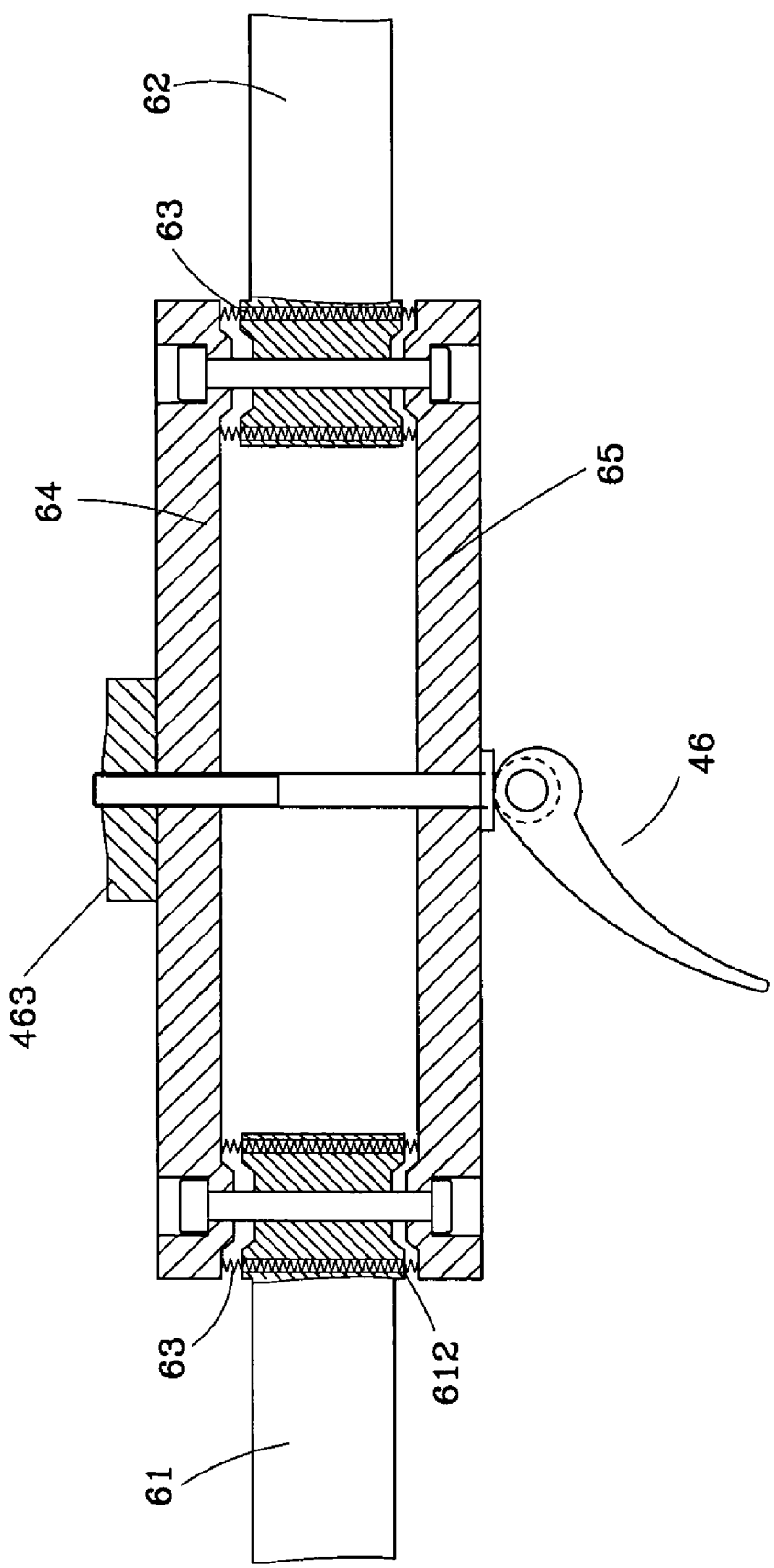
FIG. 11 is a sectional assembly view of FIG. 10, showing the folding structure unlocked.

FIGS. 10 and 11 show a foldable bicycle frame according to the third embodiment of the present invention. According to this embodiment, the folding structure, referenced by 60, comprises a top connecting bar 64, a bottom connecting bar 65, a plurality of spring members 63, two pins 43, two screw members 44, and a locking mechanism 46. The front top tube 51 and the rear top tube 52 each have a plurality of vertical through holes 612 or 622 in the respective coupling end 611 or 621. The spring members 63 are respectively inserted through the through holes 612 and 622 of the front top tube 51 and the rear top tube 52 and stopped between the top connecting bar 64 and the bottom connecting bar 65 to force the connecting bars 64 and 65 away from the front top tube 51 and the rear top tube 52. Because the spring members 63 are kept in the through holes 612 and 622 of the front top tube 51 and the rear top tube 52, the whole structure of the locking mechanism 60 causes a sense of beauty.

Figure 12:
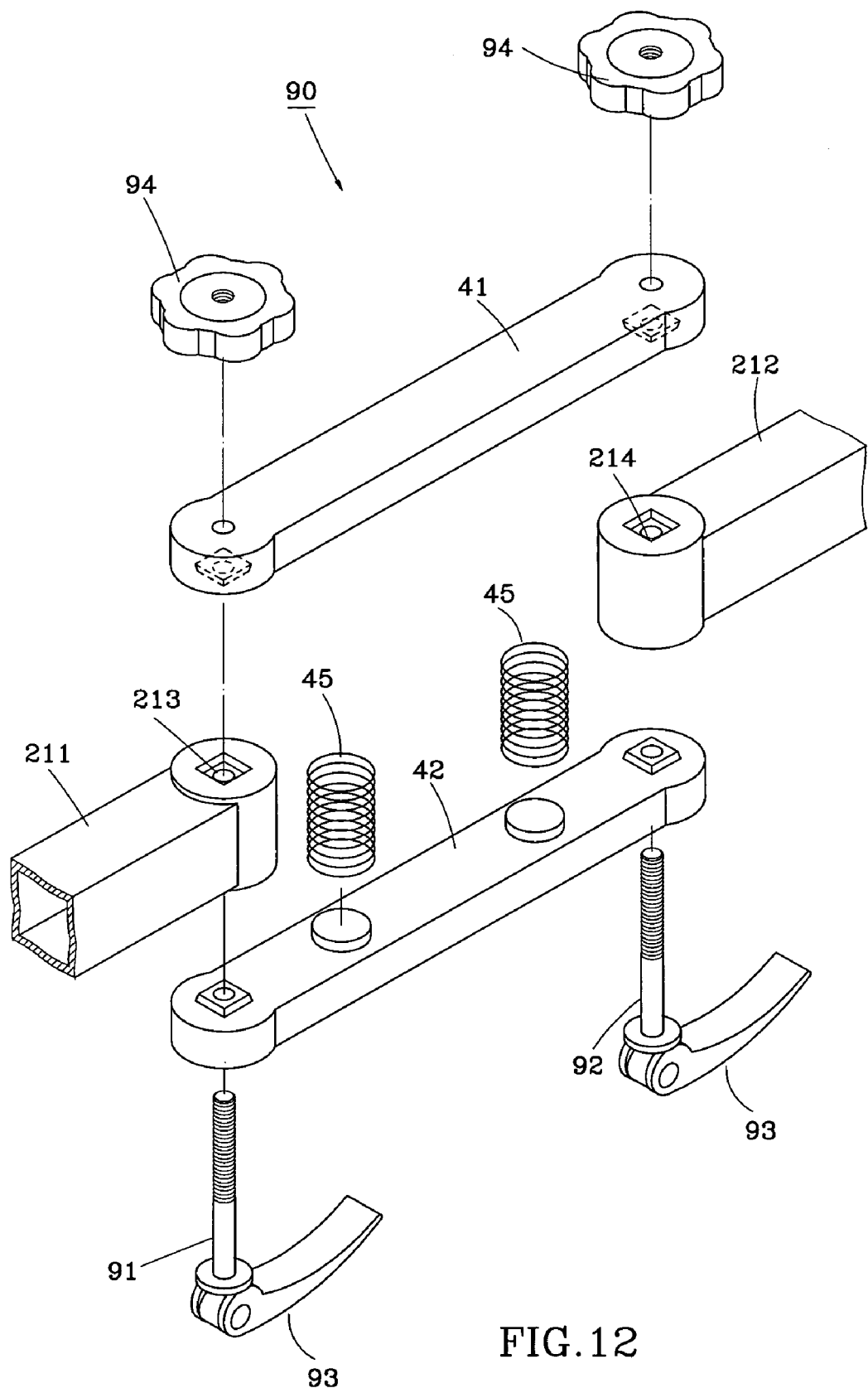
FIG. 12 is an exploded view of a folding structure for foldable bicycle frame according to a fourth embodiment of the present invention.
Figure 13:
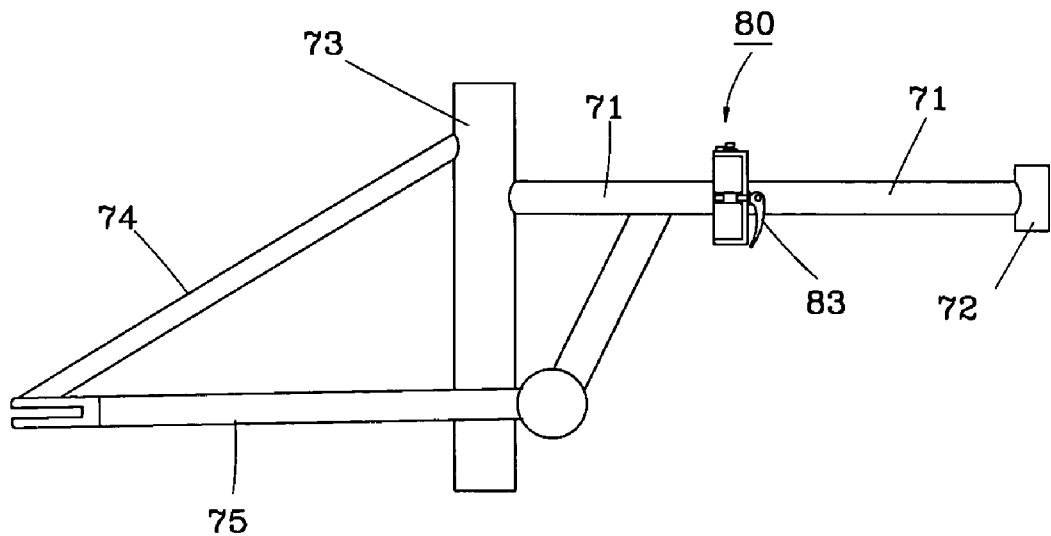
FIG. 13 is a schematic drawing showing a foldable bicycle frame according to the prior art.
Figure 14:
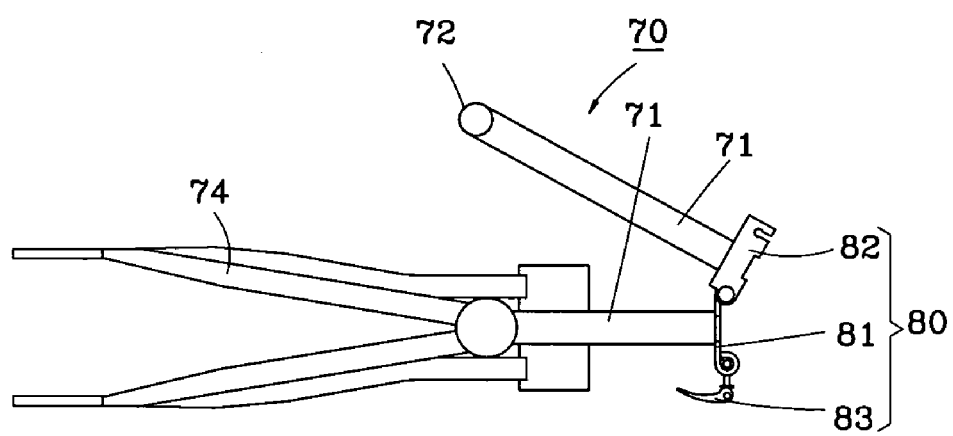
FIG. 14 is a schematic drawing showing the folding status of the foldable bicycle frame according to the prior art.

FIG. 12 shows a foldable bicycle frame according to the fourth embodiment of the present invention. According to this embodiment, the folding structure, referenced by 90, uses two locking mechanisms to control locking/unlocking of the connecting bars 41 and 42 and the front top tube 211 and the rear top tube 212, each locking mechanism comprising an axle 91 or 92 respectively inserted through the connecting bars 42 and 41 and the axle hole 213 or 214 of the front top tube 211 or rear top tube 212, a knob 94 threaded onto the top end of the axle 91 or 92, and a locking lever 93 pivoted to the bottom end of the axle 91 or 92.

In the aforesaid various embodiments, the locating blocks or ribs of the top and bottom connecting bars are adapted to engage the recesses or locating grooves at the front and rear top tubes to prohibit the front and rear top tubes from turning about the respective pins relative to each other. However the shape and number of the locating blocks/ribs of the top and bottom connecting bars and the recesses/locating grooves of the front and rear top tubes and the number and location of the spring members are not limited to the aforesaid embodiments, and various modifications and enhancements may be made without departing from the spirit and scope of the invention. Accordingly, the invention is not to be limited except as by the appended claims.

What is claimed is:

1. A foldable bicycle frame comprising a top tube having a front top tube with a rear coupling end and a rear top tube with a front coupling end, a head tube at a front side of said top tube, a seat tube at a rear side of said top tube, and a rear fork assembly obliquely backwardly extending from said seat tube opposite to said top tube, and a folding structure connected between the rear coupling end of said front top tube and the front coupling end of said rear top tube, wherein said folding structure comprises:

a top connecting bar and a bottom connecting bar arranged in parallel at top and bottom sides of said front top tube and said rear top tube and respectively pivotally coupled to rear coupling end of said front top tube and the front coupling end of said rear top tube to join said front top tube and said rear top tube and respectively vertically movable relative to said front top tube and said rear top tube between a first position wherein said top connecting bar and said bottom connecting bar are respectively engaged with said front top tube and said rear top tube at top and bottom sides to prohibit relative movement between said front top tube and said rear top tub, and a second position where said top connecting bar and said bottom connecting bar are disengaged from said front top tube and said rear top tube for allowing said front top tube and said rear top tube to be turned relative to each other;

at least one spring stopped between said top connecting bar and said bottom connecting bar for holding said top connecting bar and said bottom connecting bar in said second position; and a locking mechanism having at least one axle mounted in said top connecting bar and said bottom connecting bar, and at least one operating member provided at one end of said axle and turnable relative to said axle between a locking position to lock said top connecting bar and said bottom connecting bar in said first position, and an unlocking position to unlock said top connecting bar and said bottom connecting bar for enabling said top connecting bar and said bottom connecting bar to be moved by said spring to said second position.

2. The foldable bicycle frame as claimed in claim 1, further comprising two pins respectively fastened to two distal ends of said top connecting bar and said bottom connecting bar and the rear coupling end of said front top tube and the front coupling end of said rear top tube to pivotally connect said top connecting bar and said bottom connecting bar to said front top tube and said rear top tube, said pins each having two ends respectively terminating in an expanded head to limit vertical movement of said top connecting bar and said bottom connecting bar relative to said front top tube and said rear top tube to a predetermined distance between said first position and said second position.

3. The foldable bicycle frame as claimed in claim 1, wherein said axle has a threaded shank, and said operating member is a knob threaded onto the threaded shank of said axle.

4. The foldable bicycle frame as claimed in claim 1, wherein said operating member is a locking lever pivoted to one end of said axle.

5. The foldable bicycle frame as claimed in claim 4, wherein said locking mechanism further comprises a rotating member provided at one end of the axle remote from the respective locking lever.

6. The foldable bicycle frame as claimed in claim 5, wherein said rotating member is a knob threaded onto one end of the axle of the locking mechanism.

7. The foldable bicycle frame as claimed in claim 1, wherein said front top tube has two recessed portions respectively formed in top and bottom sides of the rear coupling end thereof; said rear top tube has two recessed portions respectively formed in top and bottom side of the front coupling end thereof; said top connecting bar and said bottom connecting bar each have two protruding portions for engaging the recessed portions of said front top tube and said rear top tube.

8. The foldable bicycle frame as claimed in claim 7, wherein the protruding portions of said top connecting bar and said bottom connecting bar are rectangular blocks; the recessed portions of said front top tube and said rear top tube are rectangular recesses.

9. The foldable bicycle frame as claimed in claim 7, wherein the protruding portions of said top connecting bar and said bottom connecting bar are crossed ribs; the recessed portions of said front top tube and said rear top tube are crossed grooves.

10. The foldable bicycle frame as claimed in claim 1, comprising a plurality of said springs; wherein said front top tube has a plurality of vertical through holes in the rear coupling end thereof; said rear top tube has a plurality of vertical through holes in the front coupling end thereof; wherein said springs are respectively inserted through the vertical through holes of said front top tube and the vertical through holes of said rear top tube and respectively stopped between said top connecting bar and said bottom connecting bar.

11. The foldable bicycle frame as claimed in claim 1, comprising two said springs; wherein said top connecting bar has two downwardly protruding locating blocks; said bottom connecting bar has two upwardly protruding locating blocks; wherein said springs each have two distal ends respectively coupled to the downwardly protruding locating blocks of said top connecting bar and the upwardly protruding locating blocks of said bottom connecting bar.

12. The foldable bicycle frame as claimed in claim 1, wherein said locking mechanism includes two said axles which are respectively inserted through said top connecting bar and said bottom connecting bar and the rear coupling end of said front top tube and the front coupling end of said rear top tube to pivotally connect said front top tube and said rear top tube to said top connecting bar and said bottom connecting bar; and two said operating members which are knobs respectively threaded onto one end of the axle of the respective locking mechanism.

* * * * *